(12) United States Patent
Jotz et al.

(10) Patent No.: US 10,669,185 B2
(45) Date of Patent: Jun. 2, 2020

(54) APPARATUS AND METHOD FOR ALIGNING SCORING NEEDLES AND FOR SCORING GLASS SUBSTRATES

(71) Applicant: SCHOTT AG, Mainz (DE)

(72) Inventors: Matthias Jotz, Alfeld (DE); Volker Plapper, Alzey (DE); Juergen Vogt, Oberheimbach (DE)

(73) Assignee: SCHOTT AG, Mainz (DE)

( * ) Notice: Subject to any disclaimer, the term of this patent is extended or adjusted under 35 U.S.C. 154(b) by 240 days.

(21) Appl. No.: 15/423,010

(22) Filed: Feb. 2, 2017

(65) Prior Publication Data

US 2017/0217817 A1 Aug. 3, 2017

(30) Foreign Application Priority Data

Feb. 2, 2016 (DE) .................. 10 2016 101 766

(51) Int. Cl.
| | |
|---|---|
| *C03B 33/037* | (2006.01) |
| *C03B 33/033* | (2006.01) |
| *C03B 33/10* | (2006.01) |
| *C03B 33/023* | (2006.01) |

(52) U.S. Cl.
CPC ........ *C03B 33/037* (2013.01); *C03B 33/0235* (2013.01); *C03B 33/033* (2013.01); *C03B 33/105* (2013.01)

(58) Field of Classification Search
CPC . C03B 33/037; C03B 33/0235; C03B 33/033; C03B 33/105; B26D 7/262; B26D 3/08; B26D 5/007; B26D 7/2614; B26D 3/085; Y10T 83/0333; Y10T 83/0385; C03C 3/087; C03C 3/091; C03C 3/093; C03C 3/095; C03C 3/097; C03C 3/11
USPC ......... 83/880, 663, 676, 698, 481, 886, 881, 83/667, 333, 386, 884, 578, 699; 30/164.95, 307; 225/2, 96, 96.5, 104
See application file for complete search history.

(56) References Cited

U.S. PATENT DOCUMENTS

| | | | | |
|---|---|---|---|---|
| 3,680,213 | A * | 8/1972 | Reichert | B28D 5/0011 257/E21.239 |
| 4,576,076 | A * | 3/1986 | Pyle | B23D 45/024 83/471.3 |
| 5,687,625 | A * | 11/1997 | Galan | B26D 7/0006 83/427 |
| 7,818,981 | B2 * | 10/2010 | Lisec | B24B 7/242 65/174 |
| 2003/0070520 | A1 * | 4/2003 | Gawazawa | B28D 5/023 83/452 |
| 2004/0126995 | A1 | 7/2004 | Ohno et al. | |

(Continued)

FOREIGN PATENT DOCUMENTS

| | | |
|---|---|---|
| DE | 102014110855 | 2/2016 |
| DE | 102015120566 | 6/2016 |

*Primary Examiner* — Ghassem Alie
(74) *Attorney, Agent, or Firm* — Ohlandt, Greeley, Ruggiero & Perle, L.L.P.

(57) ABSTRACT

A method is provided for aligning scoring tools and for scoring glass, in particular thin glass, along predetermined scoring lines in preparation for breaking along the score. Glass substrates, in particular thin glass substrates, produced by such method are also provided. The method includes the determination of the actual orientation of the cutting edge of the scoring tool and aligning of the cutting edge to a target orientation of the cutting edge.

20 Claims, 2 Drawing Sheets

(56) References Cited

U.S. PATENT DOCUMENTS

| | | | |
|---|---|---|---|
| 2012/0325070 A1* | 12/2012 | Bando | B28D 1/225 83/880 |
| 2013/0112058 A1* | 5/2013 | Brown | C03B 33/107 83/880 |
| 2016/0033379 A1 | 2/2016 | Heiss-Choquet et al. | |
| 2016/0185647 A1 | 6/2016 | Vogt et al. | |

* cited by examiner

APPARATUS AND METHOD FOR ALIGNING SCORING NEEDLES AND FOR SCORING GLASS SUBSTRATES

CROSS REFERENCE TO RELATED APPLICATIONS

This application claims benefit under 35 U.S.C. § 119(a) of German Patent Application No. 10 2016 101 766.3, filed Feb. 2, 2016, the entire contents of which are incorporated herein by reference.

BACKGROUND

1. Field of the Invention

The invention relates to an apparatus and to a method for aligning scoring tools and for scoring glass, in particular thin glass, along intended scoring lines in preparation for score and break separation. The invention furthermore relates to glass substrates, in particular thin glass substrates, produced by such method.

2. Description of Related Art

Thin glass particularly refers to sheet glass having a thickness in a range between 1.2 mm and 3 µm, which can be manufactured in the form of a glass ribbon or glass film and can be wound. In the context of the present application, thin glass in particular refers to plate-shaped or ribbon-shaped or film-like glass with a thickness of not more than 400 µm, not more than 145 µm, not more than 100 µm, not more than 50 µm, not more than 30 µm, not more than 20 µm, but with a minimum thickness of 3 µm, or of 10 µm, or of 15 µm being met. Ultra-thin glass (UTG) has a wall thickness of less than 150 µm.

Thin glasses are used in many fields of technology, for example in displays, in windows for optoelectronic components, in encapsulations of components, and in electrically insulating layers, and also in the field of photovoltaics. For this kind of applications, small thin glass plates are required. However, thin glass is mainly produced as a glass ribbon or glass film, and recently thicknesses of less than 350 µm are demanded. When such a thin glass ribbon or such a thin glass film is to be processed into smaller thin glass plates, numerous handling problems are encountered, for example, with respect to singularization or handling during further processing.

For example, there is a risk of premature and unwanted breaking of the thin glass due to unintentionally introduced initial damages leading to reduced edge strength. To address the risk of premature breaking along the score, the prepared scores must have a predefined quality. The scores should have a depth as uniform as possible, that means the scoring tool has to be guided precisely along the intended scoring line and with the most consistent scoring contact pressure force possible. In a thickness range between 1.2 mm and 150 µm this is feasible because of the comparatively high scoring contact pressure force to be set for scoring. However, if even thinner or ultra-thin glass is desired to be scored and the scoring contact pressure force applied to the thin glass must assume very small values, there is an increasing risk of causing unwanted surface damage.

If a diamond needle is used as a scoring tool for scoring very thin glasses having a thickness of less than 50 µm, the edge of this needle need to be precisely aligned in the direction of advancement. The alignment is usually made manually on the basis of markings on the tool and is therefore very complicated and time-consuming.

In the field of further processing it is often desired to be supplied with thin glass not in the form of small prefabricated thin glass plates, but rather with thin glass in the form of a plate or wound into a roll and prepared for being separated into small thin glass plates. However, in the case of pre-scored thin glass there is the concern of premature breaking along the scores. Already a single fracture may seriously disturb the further processing process, since glass particles might be produced which make further processing considerably more difficult.

SUMMARY

Therefore, an object of the present invention is to provide an apparatus and a method for aligning scoring needles and for scoring glass substrates as a preparation for breaking along the scores.

Score and break separation is intended for obtaining small thin glass plates. The apparatus and the method should moreover permit to produce pre-scored glass plates or films and at the same time ensure reliable further processing of the pre-scored glass.

In particular it should be possible to be able to score thin and ultra-thin glass (UTG) with low and constant cutting forces and thereby to achieve a high edge strength of the so produced score.

The apparatus and the method should moreover be applicable on a large industrial scale so that extensive manual alignment of the scoring tool or even complex cutting tests can largely be dispensed with.

This object is achieved in a surprisingly simple manner by an apparatus and a method for aligning scoring needles and for scoring a glass substrate and by a pre-scored glass substrate as described herein.

The invention accordingly relates to a method for aligning a scoring tool for scoring a glass substrate along a predetermined scoring line for the purpose of score and break separation, the method comprising the steps of: providing the glass substrate with a planar surface; providing and approaching a mechanical scoring tool to the glass substrate, wherein the scoring tool is aligned for scoring in the direction of the predetermined scoring line but does not yet touch the glass substrate; pre-aligning the cutting edge of the scoring tool in advancement direction; determining the actual position of at least one cutting edge of the scoring tool by a position detection method; aligning the scoring tool by changing the actual orientation of the cutting edge by rotating the cutting edge in a plane perpendicular to the surface of the glass substrate and/or tilting the cutting edge to change its inclination to bring the cutting edge of the scoring tool into the desired target orientation relative to the advancement direction.

The method according to the invention may furthermore comprise the steps of lowering the scoring tool onto the surface of the glass substrate along the scoring line in the advancement direction and applying a cutting force to the scoring tool.

Then, after the scoring tool has been aligned in the target direction, it can be moved in advancement direction relative to the surface of the glass substrate to be scored in order to create a score along the predetermined scoring line in the surface of the glass substrate.

In this way it is possible to obtain small thin glass plates. However, it is also possible to produce pre-scored glass plates or films, in particular thin glass plates or films.

The aforementioned method permits to automatically detect the actual position of the cutting edge of the scoring tool, that is to say the current orientation of the cutting edge, and to align it with very high precision into a target orientation prior to creating the score in the surface of the glass substrate. While in the case of manual alignment of the cutting edge deviations from the ideal orientation are often in a range of ±5° or more, the aforementioned method permits to align the cutting edge of the scoring tool with a deviation from the ideal orientation of the respective cutting edge, i.e. the target orientation, of significantly less than ±5°. The target orientation defines the ideal orientation of the cutting edge of the scoring tool with respect to the advancement direction of the scoring tool.

Preferably, the actual alignment of the cutting edge of the scoring tool when creating the score has a deviation of less than ±2°, preferably less than ±1° from the target orientation. Accordingly, the method of the invention permits to align with high precision the actual cutting edge of the scoring tool relative to the intended direction of movement, i.e. the advancement direction, and relative to the surface of the glass substrate to be scored.

In this way it is possible to avoid inaccuracies in scoring, but also to prevent transverse forces from acting on the scoring tool. Thus, a possible formation of transverse cracks in the scored line can be prevented, which might otherwise lead to a reduced edge strength of the pre-scored glass substrate or even to unwanted premature breaking along the score.

With the method of the invention it is possible to achieve a high edge strength of the score edge amounting to approximately 300 MPa. This value is comparable to the edge strength of a score edge produced by a $CO_2$ laser cutting process. High edge strength reduces the risk of undesired and premature breaking of the scored glass substrate.

The edge strength can be determined by a method which uses an apparatus with a so-called stepped roller. The surface of a sample is pressed against a circular, elliptical or parabolic template surface, whereby a bending is imposed on a portion of the sample and therefore also on a portion along the edge of the sample. The bending radius R of this bending is proportional to the tensile stress a. Furthermore, the method is based on the knowledge that the tensile stress a increases with decreasing bending radius R. What is finally evaluated is at which tensile stress a or at which bending radius R the specimen has broken. The edge strength is then derived on the basis of the breaking stress $\sigma_B$.

A detailed description of this apparatus and method can be found in document DE 10 2014 110 855.8 which is hereby incorporated by reference in its entirety.

In particular in the case of ultra-thin glasses with a thickness of less than 350 μm, more particularly less than 150 μm, the above-mentioned method offers great advantages, since the geometrical conditions to be observed in scoring are very narrow in order to enable reproducible score and break separation.

The method of the invention furthermore makes it possible to use diamond needles, in particular even very sharp diamond needles, in which case the requirements on exact alignment of the scoring tool during scoring and on the depth and edge inclination of the score are very high. Diamond needles are distinguished by a particularly long service life and therefore provide for a very cost-efficient process.

The previously common series of cutting tests with subsequent light microscopic analysis of the scored line can be dispensed with when using the method of the invention.

So, the method can be successfully performed even under manufacturing conditions without complicated manual interventions. With the alignment of the respective cutting edge of the scoring tool, the scoring tool can even be replaced during a scoring operation without altering the quality of the score, for example.

The glass substrate may be provided in the form of a sheet, plate, ribbon, or film. The mechanical scoring tool is approached to the glass substrate to be scored, preferably it is already roughly aligned with its cutting edge in the advancement direction, that is the direction of the predetermined scoring line. Prior to the first contact with the surface of the glass substrate, the exact position of the cutting edge of the scoring tool is optically detected.

According to the invention, the spatial orientation, i.e. the actual orientation of the at least one cutting edge of the scoring tool is determined by the position detection method for this purpose. The position detection method is based on the principle of triangulation for which a beam source for emitting electromagnetic radiation and a detector for receiving this electromagnetic radiation are provided. The beam source is preferably a light source, in particular a point light source. A photodetector may be used as the detector.

Light emitted by the light source is irradiated onto the area of the scoring tool including the at least one cutting edge, and the light reflected therefrom is captured by the photodetector. What is exploited in this case is that planar ground surfaces of the scoring tool such as those extending on both sides of the cutting edge, have a reflective effect and therefore act as a mirror. When the scoring tool is now exposed to electromagnetic radiation in the area of the at least one cutting edge from the advancement direction, the proportion of the radiation reflected from the edges can be captured by the detector and used for alignment.

For further supporting the alignment it is possible to mark the distance between the beam source and the cutting edge of the scoring tool and also the required position of the projected image points by means of templates. In this way it is possible to alter the orientation of the cutting edge with respect to the advancement direction and to arrange it in the target orientation with just a few adjustment measures.

Based on the geometrical information about the distance and the angle of the beam source and using the at least two reflective surfaces on the scoring tool, the cutting edge can be moved to its desired orientation by being rotated in the plane perpendicular to the glass substrate to be cut. If the scoring tool has a third reflective surface in the area of the cutting edge, it is possible to determine the inclination of the cutting edge relative to the surface of the glass substrate to be cut in the advancement direction using this third reflecting surface, and to move it into the desired orientation.

Accordingly, the orientation of the scoring tool in its mounted state can be modified by changing the actual orientation by rotating the cutting edge in a plane perpendicular to the surface of the glass substrate and/or by tilting the cutting edge to change its inclination, and can be brought into the target orientation in this manner. This target orientation defines the position of the cutting edge relative to the advancement direction and to the surface of the glass substrate to be scored. The inclination of the cutting edge is the angle resulting between a straight line in parallel to the cutting edge and the plane defined by the surface of the glass substrate to be scored.

To help in altering the orientation of the cutting edge, fine adjustment means may be provided which may favorably be integrated into an apparatus such as a machine tool.

For example, the target orientation of the cutting edge of the scoring tool may be determined by cutting tests and subsequent analysis of the score and can be stored in a database. The target orientation of the cutting edge may depend on the material and geometry of the cutting edge of the scoring tool, on the glass composition of the glass substrate to be scored, and on the thickness of the glass substrate.

Once the cutting edge of the scoring tool has been aligned, the scoring tool can be brought into contact with the surface of the glass substrate and a cutting force can be applied. Then, the scoring tool and the glass substrate can be moved relative to each other to produce the score along the predetermined scoring line. The scoring tool is guided over the surface of the glass substrate along the intended scoring line, in the advancement direction.

For scoring thin or ultra-thin glass, very low cutting forces are required. In order to produce a high-quality score, a pre-set cutting force need to be kept constant during scoring. For introducing a score into such a glass substrate, a cutting force of at most 1 N is suggested, preferably of not more than 0.7 N, and most preferably not more than 0.5 N, and a deviation from the predefined cutting force during a scoring operation is at most 0.01 N.

The present method permits to score glass substrates of different thickness. However, the method is particularly suitable for scoring thin glass. The thin glass may include ultra-thin glass (UTG). The glass substrate to be scored may accordingly have a thickness of not more than 400 µm, not more than 145 µm, not more than 100 µm, not more than 50 µm, not more than 30 µm, not more than 20 µm.

In a preferred embodiment, the scoring tool comprises a scoring needle in order to produce a precise score. Most preferably, the scoring needle includes a scoring diamond for producing the score, which in addition to a high-precision cutting edge also provides for a long service life of the scoring tool.

In this case, the cutting portion of the scoring diamond has planar ground faces converging at the tip and intersecting at common edges that extend from the tip. These edges define the cutting edges. Preferably, the tip has an acute truncated shape. For example, the tip may have the shape of a truncated pyramid, truncated tetrahedron, or truncated octahedron. Such shapes of the tip allow to provide a plurality of different cutting edges on a tool.

According to a further aspect of the invention, an apparatus is suggested for aligning a scoring tool for scoring a glass substrate along a predetermined scoring line for the purpose of score and break separation. This apparatus comprises means for performing a position detection method for determining the actual orientation of the cutting edge of the scoring tool. Furthermore, the apparatus comprises means for adjustment, preferably for fine adjustment, of the cutting edge. The fine adjustment means can be used to alter the orientation of the cutting edge by rotating the cutting edge in a plane perpendicular to the surface of the glass substrate and/or by tilting the cutting edge to modify its inclination, so that it can be brought into the desired target orientation.

The apparatus for aligning a scoring tool for scoring glass substrates along a predetermined scoring line for score and break separation according to the method described above may comprise the following components: a machine tool; a drivable feed unit; a cutting head; a scoring tool; a driving mechanism for drawing the scoring tool along the predetermined scoring line; a position detection device for detecting the actual orientation of the geometry of the at least one cutting edge of the scoring tool relative to the scoring line and to the surface of the glass substrate to be scored; a processing unit for determining control values for aligning the scoring tool from the actual orientation into the target orientation; mechanical means for fine adjustment of the scoring tool in order to bring the scoring tool from the actual orientation into the predetermined target orientation by tilting or rotating it.

Cutting heads comprising a scoring tool are commonly known and can be provided in a form as disclosed in document DE 10 2014 117 641.3, for example.

The fine adjustment means allow to fixedly retain the scoring tool in the mounted position. However, the fine adjustment means also permit to spatially modify the mounted position of the cutting edge. The fine adjustment means may as well be automated, for example implemented using linear drives, for changing the mounted position of the scoring tool so as to bring the cutting edge from its actual orientation into the target orientation.

A further aspect of the invention relates to the manufacturing of pre-scored glass substrates, for example in the form of plates or films, as a semifinished product for further processing at a later time, in which case the singularization of the pre-scored glass substrate is accomplished offset in time.

The invention will now be described in more detail by way of preferred embodiments and with reference to the accompanying figures. Further details of the invention will be apparent from the description of the illustrated exemplary embodiments and the appended claims.

DETAILED DESCRIPTION

Figure 1:
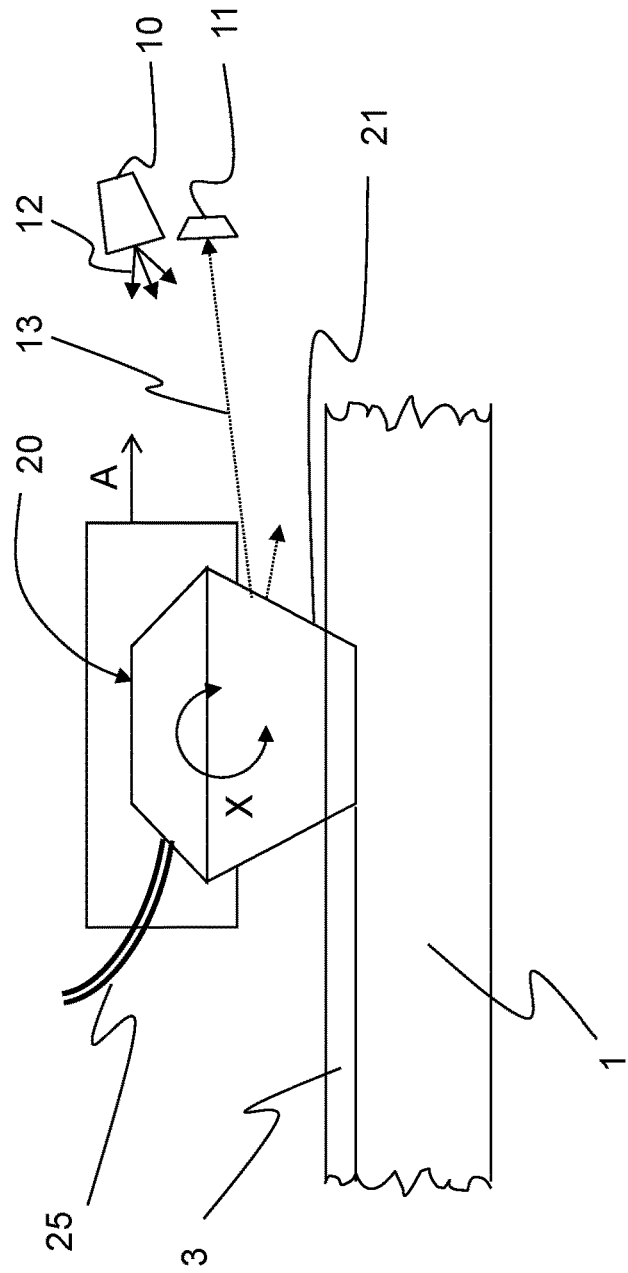
FIG. 1 schematically illustrates thin glass while being scored.

For the sake of clarity, the same reference numerals in the following detailed description of preferred embodiments designate substantially similar parts in or at these embodiments. For better illustrating the invention, however, the preferred embodiments shown in the figures are not always drawn to scale.

FIG. 1 schematically illustrates the generation of scores 3 in a glass substrate 1. The scoring head comprises a mechanical scoring tool 20. Scoring tool 20 includes a ground diamond having a front cutting edge 21, which is also referred to as a bow cutting edge. The direction of movement of the scoring tool 20 relative to the glass substrate 1 corresponds to the advancement direction and is indicated by "A". Glass substrate 1 is a thin glass plate as used for components in the fields of biology, medical technology, electrical engineering, and electronics.

For determining the actual orientation of the cutting edge 21, a position detection method is suggested which uses a light source and a photodetector. The position detection method is based on the principle of triangulation in which light emitted by the light source is irradiated onto the sensed area and the light reflected from the sensed area is received by the photodetector.

The sensed area in the sense of the invention is the area of the scoring tool facing the advancement direction, which comprises at least one cutting edge 21.

FIG. 1 schematically shows a point light source 10 and a photodetector 11. The beam source is arranged in the advancement direction. Electromagnetic radiation 12 of the point light source 10 is radiated towards the cutting edge 21 of scoring tool 20. A portion of this radiation 12 is incident on the scoring tool and is partially reflected at cutting edge 21. A portion of this reflected electromagnetic radiation 13 is then radiated back onto and detected by photodetector 11.

The electromagnetic radiation 13 reflected at cutting edge 21 can thus be detected by photodetector 11. Based thereon, the actual position of cutting edge 21 with respect to the intended advancement direction and to the surface of the glass substrate can then be determined with computer support. In the illustrated constellation, the scoring tool 20 is already aligned in the target orientation so that a score 3 can be produced.

The scoring tool 20 is accordingly aligned by rotating the cutting edge 21 in a plane perpendicular to the surface of the glass substrate 1 and/or by tilting the cutting edge 21 to alter its inclination from the current orientation into the required target orientation for generating an optimal score. The tilting of the cutting edge 21 is effected according to the rotation axis designated "X" in FIG. 1. The tilting causes a change in the angle resulting between a straight line along the cutting edge and the advancement direction A. In this manner, a predetermined angle can be set which defines the inclination of the cutting edge relative to the advancement direction.

While the schematic view illustrates a single scoring head, multiple arrays are often provided in practice in order to simultaneously produce a plurality of scores.

In addition, a channel 25 is provided in the scoring tool 20, leading to the rear side of the scoring tool and conveying a blasting liquid to the score 3 produced by the scoring tool. Thereby, score 3 is wetted with the blasting liquid. As a result, a moisture film is formed on glass substrate 1. To promote subsequent singularization for producing thin glass plates, this moisture film is heated until it at least partially evaporates with the consequence of cleaving the scores to form smaller sized plates. Singularization may be achieved immediately after the generation of the score, or else at a later time, for example during a subsequent further processing. For this purpose, a burner head with a small flame is provided for the severing process, with a tip that is guided along the scores 3 from below in order to locally heat the glass substrate and to cause the blasting liquid to vaporize. The explosive force developed in the scores 3 in this manner will cause the glass substrate to be cleaved and separated into the individual thin glass plates.

Figure 2:
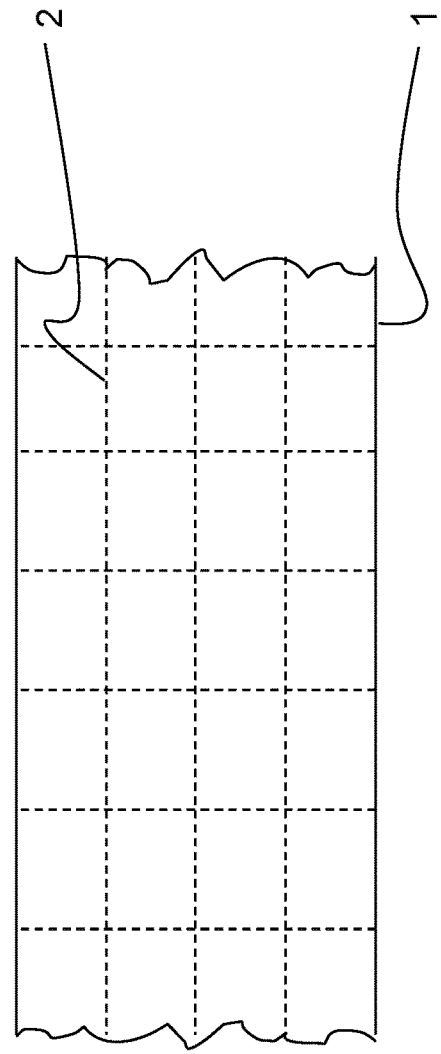
FIG. 2 is a schematic plan view of a portion of a pre-scored glass substrate.

FIG. 2 schematically shows a plan view of a portion of a pre-scored glass substrate 1. The illustrated glass substrate 1 is an ultra-thin glass having a thickness of at most 150 µm. The upper surface of glass substrate 1 is provided with a pattern of scored lines 2 which extend along the scores 3 already produced and delimit the thin glass plates to be separated from each other.

The direction of longitudinal extension of the glass substrate 1, indicated by "y" in FIG. 2, corresponds to the axis around which the scoring tool 20 can be rotated in order to be brought from the current orientation to the target orientation. The direction of transverse extension of the glass substrate 1 indicated by "x" corresponds to the axis around which the scoring tool 20 can be tilted in order to change the inclination in the advancement direction. Accordingly, the scoring tool 20 can be rotated about axes which are in parallel to the two horizontal directions of the glass substrate 1.

Figure 3:
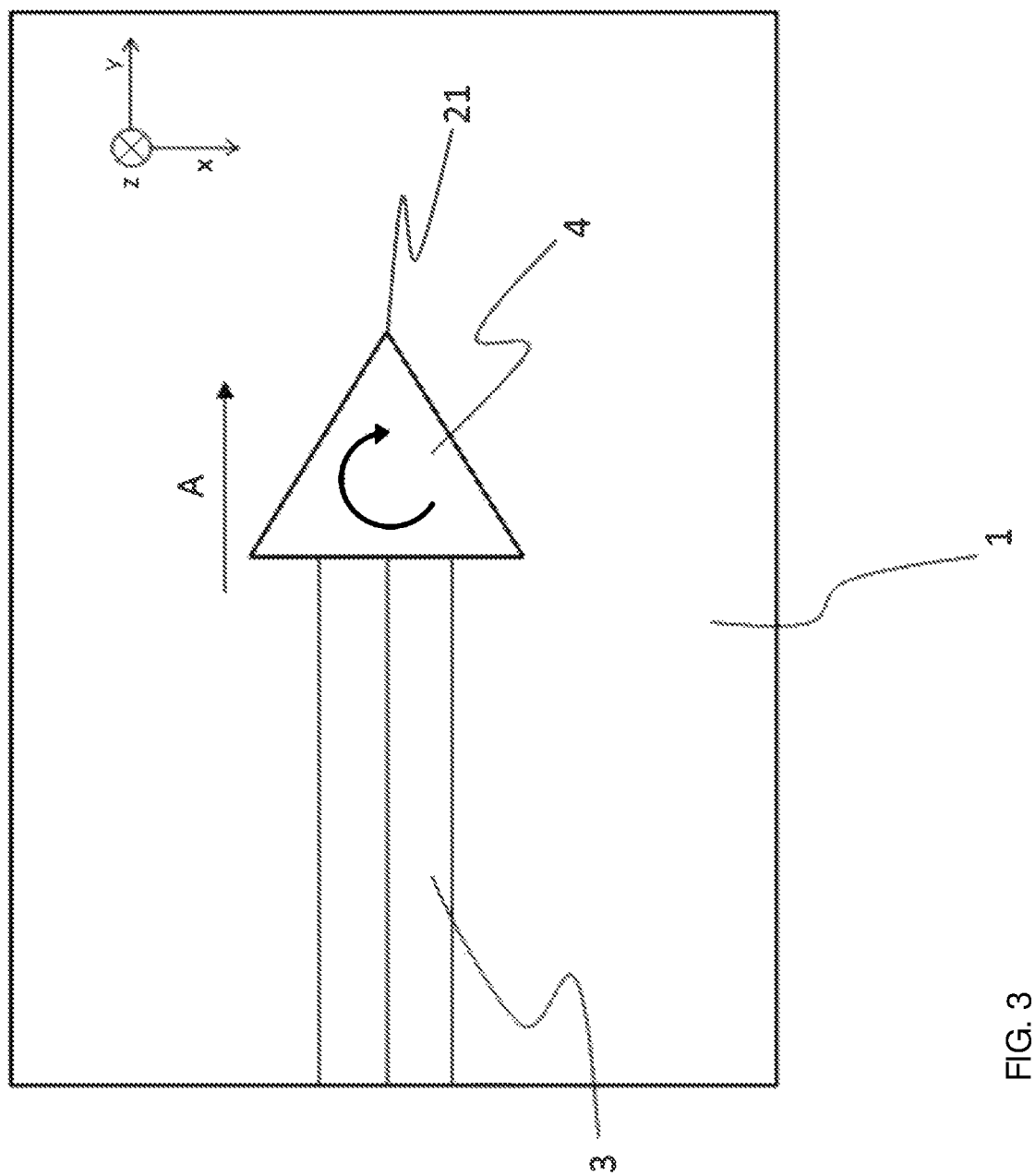
FIG. 3 is a schematic plan view of a partially scored glass substrate.

Finally, FIG. 3 is a schematic plan view of a partially scored glass substrate 1. The scoring tool 20 preferably comprises at least one diamond 4 with cutting edges 21. Furthermore, the diamond 4 can rotate about the axis indicated by "z" in FIG. 3. This rotation allows the cutting edge 21 to be aligned in the advancement direction "A" of the scoring tool 20 and thus serves to adjust the cutting force.

The cutting force that need to be applied for scoring is very small and is not more than 1 N for thin glass having a thickness of less than 400 µm. In the case of ultra-thin glass substrates 1 with a thickness in a range from 50 to 150 µm, the cutting force to be applied is at most 0.7 N, preferably at most 0.5 N, depending on the cutting angle and geometry of the diamond. In the case of even thinner glass substrates the required cutting force is even less than that, namely approximately 0.3 N.

During scoring, a cutting force as constant as possible is applied, which varies by not more than 0.05 N, preferably by less than 0.025 N, in order to produce the most consistent score 3 possible.

For performing the method according to the invention, an apparatus for aligning a scoring tool for scoring glass substrates along a predetermined scoring line for the purpose of score and break separation is provided, which comprises a machine tool (not shown).

Furthermore, the apparatus comprises a drivable feed unit, the scoring tool 20, and a drive mechanism for drawing the scoring tool along the predetermined scoring line. For this purpose, a drivable feed carriage may be provided. The scoring tool 20 is movable along horizontal directions x and y. For adjustment in z direction, a feed carriage is provided which preferably comprises a precision drive. By means of a cutting head with a precision drive as disclosed in document DE 10 2014 117 641.3, for example, it is possible to produce the scoring contact pressure force of the scoring tool 20 on the glass substrate 1.

According to the invention, the apparatus is equipped with a position detection device for detecting the actual orientation of the geometry of the at least one cutting edge of the scoring tool relative to the scoring line and to the surface of the glass substrate to be scored, which position detection device comprises a beam source 10 and a photodetector 11.

Finally, a processing unit is provided for determining control values for aligning the scoring tool from the current orientation into the target orientation.

For the purpose of aligning the scoring tool 20, mechanical means for fine adjustment of the scoring tool 20 are provided, which allow to tilt the scoring tool 20 to change its inclination relative to the glass substrate 1 to be scored and to rotate the scoring tool 20 in a plane perpendicular to the surface of the glass substrate 1 to be scored.

The alignment of the scoring tool may even be effected in automated manner. For this purpose, process control with a closed-loop control circuit is provided, comprising the position detection device, an actual value/target value controller, and the precision drive as well as the fine adjustment means. The actual value/target value controller contains a target value memory for input and storage of target values relating to the orientation of the cutting edge. The target values may depend on the material and the geometry of the cutting edge, the thickness of the glass substrate 1, the type of glass, the ambient conditions, and the cutting support.

Based on the detected actual orientation of the cutting edge 21 of the scoring tool 20 and a comparison with the stored values for the target orientation of the cutting edge 21, the fine adjustment means are equipped with drives and are driven so that the deviations in the orientation of the cutting edge 21 are minimized.

As soon as the target orientation of the cutting edge 21 is achieved, a signal is sent to the precision drive and the scoring tool 20 is lowered onto the surface of the glass substrate. After application of the predetermined cutting force, the drive mechanism drives the feed carriage according to the intended scoring line so that a score can be generated along the intended scoring line.

The method and apparatus according to the invention permit to produce thin glass plates and ultra-thin glass plates of a thickness between 400 µm and 10 µm, preferably of not more than 150 µm. However, it is also possible to produce pre-scored glass substrates with the following features: the glass substrate has a thickness in a range between 400 µm and 10 µm, preferably not more than 150 µm; score depth is between 1/20 and 1/5 of the thickness of the glass substrate; and the at least one score has an edge strength of at least 300 MPa.

What is claimed is:

1. A method for aligning a mechanical scoring tool and for scoring a thin or ultra-thin glass substrate along a scoring line, comprising the steps of:
    providing the glass substrate with a planar surface;
    moving the mechanical scoring tool to the glass substrate so that the scoring tool does not yet touch the glass substrate;
    pre-aligning a cutting edge of the scoring tool in an advancement direction, wherein the cutting edge has a shape selected from the group consisting of acute truncated shape, a truncated pyramid shape, a truncated tetrahedron shape, and a truncated octahedron shape;
    determining, without the scoring tool touching the glass, an actual orientation of the cutting edge by an automatic position detection method;
    aligning the scoring tool by changing the actual orientation of the cutting edge by rotating the cutting edge in a plane perpendicular to the planar surface and/or tilting the cutting edge to change an inclination so as to arrange the cutting edge in a desired orientation relative to the advancement direction; and
    moving the cutting edge onto the planar surface in an area of the scoring line once the cutting edge of the scoring tool has been aligned in the desired orientation.

2. The method of claim 1, further comprising: subjecting the cutting edge to a predetermined cutting force.

3. The method of claim 2, further comprising moving the cutting edge along the scoring line relative to the planar surface to produce a score.

4. The method of claim 3, wherein the cutting force deviates at most 0.05 N when moving the cutting edge along the scoring line.

5. The method of claim 2, wherein the cutting force is not more than 1 N.

6. The method of claim 2, wherein the cutting force is not more than 0.5 N.

7. The method of claim 1, wherein the step of determining the actual orientation comprises using a beam source for emitting electromagnetic radiation.

8. The method of claim 7, wherein the step of determining the actual orientation comprises using a photodetector configured to receive electromagnetic radiation reflected at the scoring tool.

9. The method of claim 8, wherein the photodetector is arranged and adapted for detecting at least a portion of the electromagnetic radiation reflected at the cutting edge.

10. The method of claim 7, wherein the beam source comprises a point light source.

11. The method of claim 7, wherein the beam source is arranged in the advancement direction and is adapted for irradiating the cutting edge to detect the actual orientation of the cutting edge relative to the scoring line and to the planar surface.

12. The method of claim 1, wherein the scoring tool comprises a scoring needle.

13. The method of claim 12, wherein the scoring needle comprises a scoring diamond.

14. The method of claim 1, wherein the glass substrate comprises thin glass or ultra-thin glass (UTG).

15. The method of claim 14, wherein the glass substrate has a thickness selected from the group consisting of not more than 400 µm, not more than 150 µm, not more than 100 µm, not more than 50 µm, not more than 30 µm, not more than 20 µm, and not more than 10 µm.

16. The method of claim 1, further comprising providing a fine adjustment device for aligning the scoring tool.

17. The method of claim 1, wherein the step of determining the actual orientation of the cutting edge comprises determining the actual orientation based on planar ground surfaces of the scoring tool.

18. The method of claim 1, wherein the step of aligning the scoring tool comprises changing the actual orientation of the cutting edge by rotating the cutting edge in the plane perpendicular to the planar surface and tilting the cutting edge to change the inclination.

19. The method of claim 1, wherein the step of aligning the scoring tool comprises aligning to a deviation of less than ±2° from a target orientation.

20. A method for aligning a mechanical scoring tool and for scoring a thin or ultra-thin glass substrate along a scoring line, comprising the steps of:
    providing the glass substrate with a planar surface;
    moving, without the scoring tool touching the glass substrate, the mechanical scoring tool to the glass substrate so that the scoring tool does not yet touch the glass substrate;
    pre-aligning, without the scoring tool touching the glass substrate, a cutting edge of the scoring tool in an advancement direction;
    determining, without the scoring tool touching the glass, an actual orientation of the cutting edge by an automatic position detection method;
    aligning, without the scoring tool touching the glass substrate, the scoring tool by changing the actual orientation of the cutting edge by tilting the cutting edge to change an inclination so as to arrange the cutting edge in a desired orientation relative to the advancement direction; and
    bringing the cutting edge into contact with the planar surface at the scoring line only after the cutting edge has been aligned to the desired orientation.

* * * * *